Patented Feb. 12, 1929.

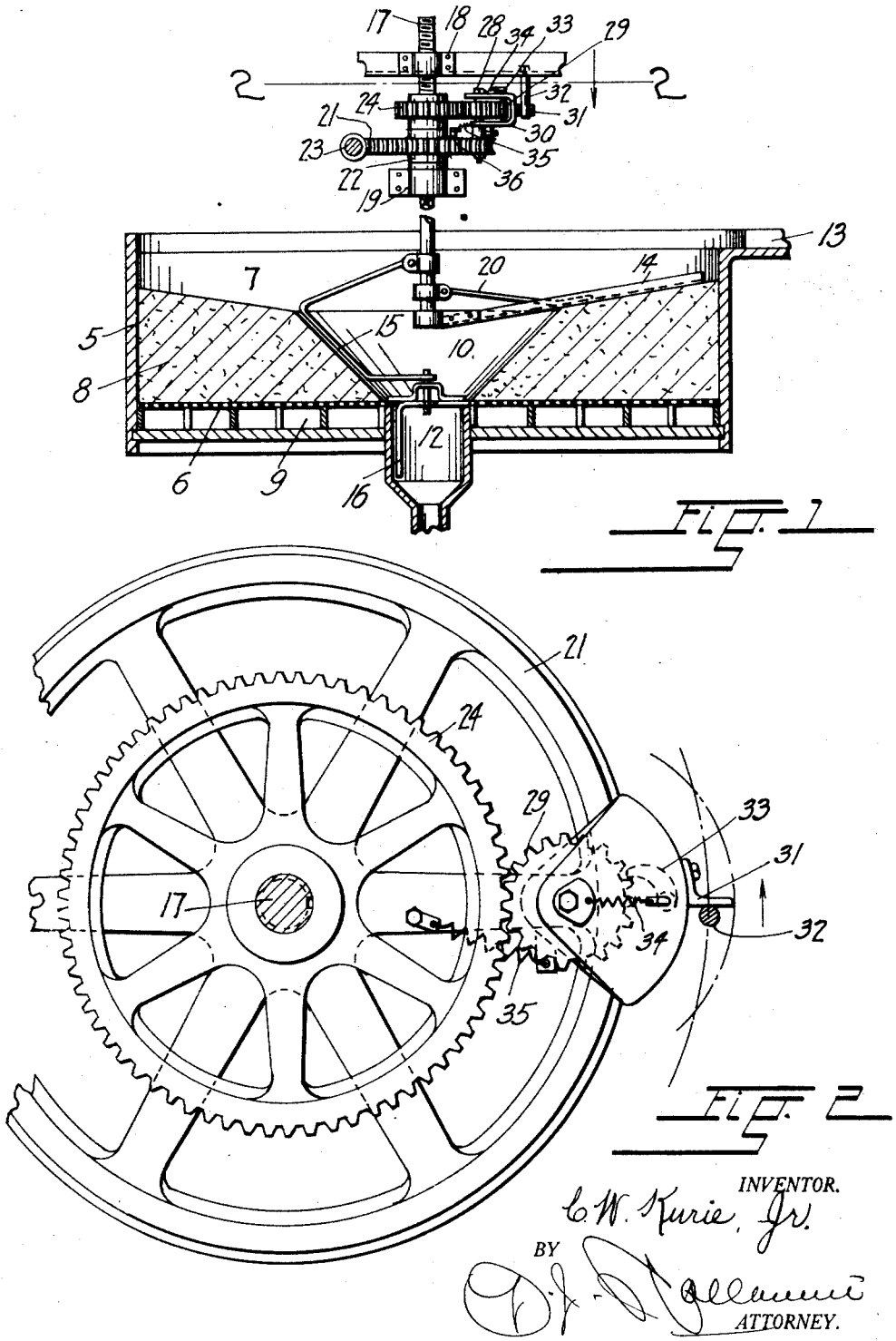

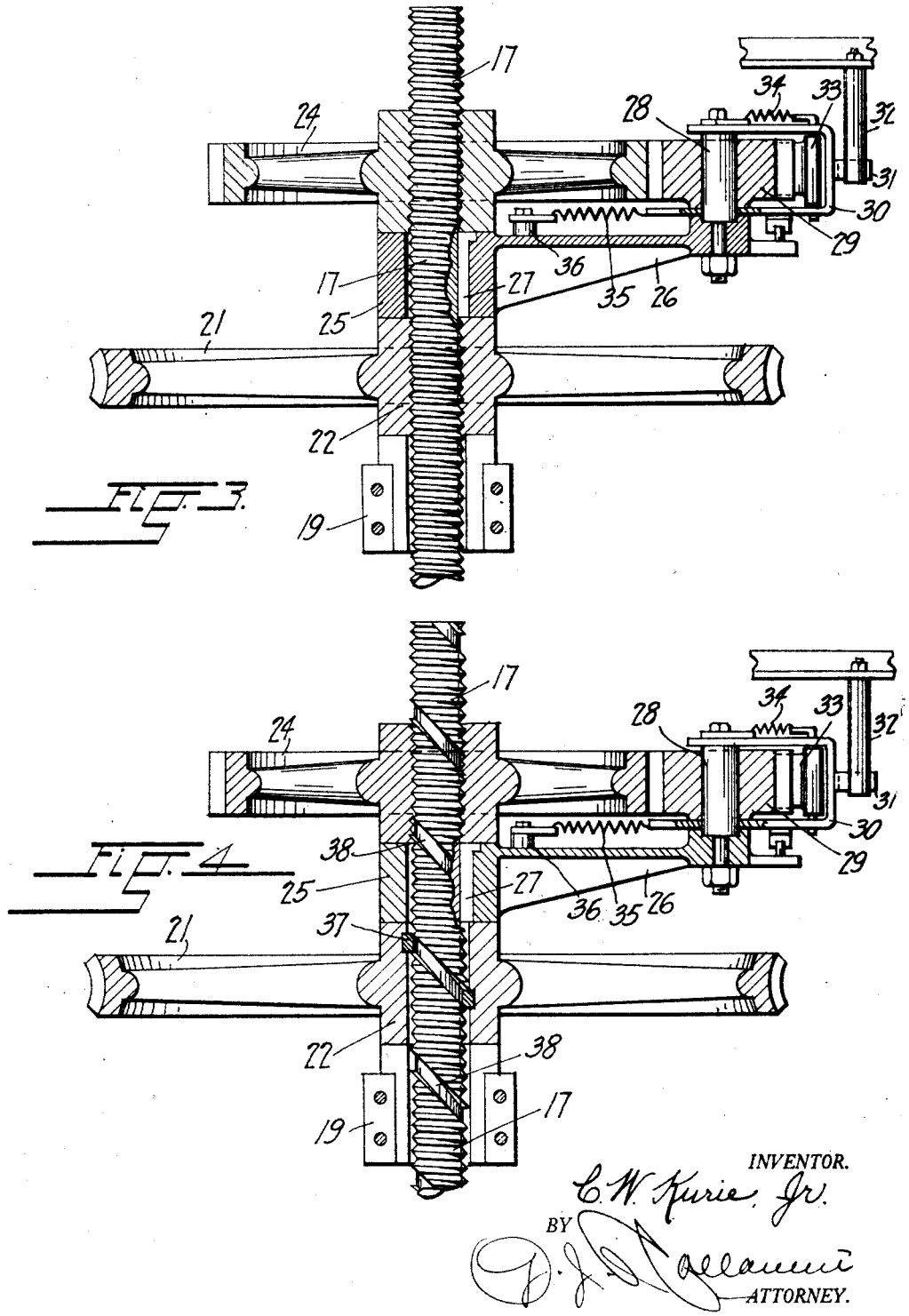

1,702,164

UNITED STATES PATENT OFFICE.

CHARLES W. KUBIE, JR., OF COLORADO SPRINGS, COLORADO, ASSIGNOR TO THE CYCLE COMPANY, OF COLORADO SPRINGS, COLORADO, A CORPORATION OF COLORADO.

MECHANICAL MOVEMENT.

Application filed May 28, 1927, Serial No. 194,978. Renewed June 29, 1928.

This invention relates to mechanical movements of the type principally used in connection with filters and thickeners in which a rotary scraper moves subsided solids to a point of discharge together with the upper strata of a filtering medium on which the solids are supported.

A mechanism of similar character has been shown and described in a companion application for patent, Serial No. 194,979, filed May 28, 1927, and it is the primary object of the present invention to provide in a mechanism in which a rotary driving action is combined with a rectilinear movement in the direction of rotation, certain novel features which adapt the mechanism particularly in the presence of heavy stresses opposing the feed motion.

Further objects reside in details of construction as will be brought out in the course of the following description.

In the accompanying drawings in which like parts are correspondingly designated throughout the several views, Figure 1 represents a sectional elevation of a thickener or filtering apparatus equipped with a scraping mechanism including the improvements of the present invention, Figure 2, an enlarged fragmentary horizontal section of the mechanism taken on the line 2—2 in Figure 1, Figure 3, a vertical section along the line 3—3, Figure 2, and Figure 4, a section similar to Figure 3, showing a modification of the construction.

The thickening or filtering apparatus illustrated in Figure 1 comprises a usually cylindrical tank 5 divided by a horizontal perforated partition 6 into an upper compartment 7 containing a bed of filtering material 8, and a lower compartment 9 in which the liquid passing through the bed is collected. The filter bed has a central funnel-shaped well or passage 10 for the discharge of material removed at the surface thereof, and this well connects with a duct 12 through which the material passes to a distant point of discharge.

A peripheral overflow 13 at the upper edge of the tank provides for the decantation of clear liquid rising out of the settling solids.

The material at the surface of the filter bed is removed by a rotary scraper 14 and in order to maintain the bed in a condition of maximum efficiency, its fouled upper strata is removed with the thickened solids by feeding the scraper downwardly at periodic intervals during its rotation. Other scrapers 15 and 16, adapted to clean the well and the duct of adhering matter, may be connected to move in unison with the principal scraper as shown in the drawings, without interference with the vertical movement of the shaft.

The mechanism for rotating and feeding the scraper 14, comprises a screw-threaded shaft 17 suspended in a vertical position and in coaxial relation to the tank in suitable bearings 18 and 19. The scraper is attached at the lower end of the shaft and reenforced by braces 20.

A worm wheel 21 has a hub 22 which by means of an internal screw thread cooperating with that of the shaft, provides the means for connecting the wheel with the shaft to impart a rotary motion thereto, while permitting of the downward movement of the shaft through the wheel. The worm wheel which constitutes the driving element of the mechanism, meshes with a worm 23 operatively associated with a conveniently located motor.

The intermittent lengthwise feed movement of the shaft for the purpose of removing upper strata of the filter bed by the rotary movement of the scraper, is produced through the instrumentality of a nut gear 24 mounted on the shaft in superposed relation to the driving gear.

Disposed between the hubs of the two wheels is the hub 25 of a pinion support 26 which has a key 27 fitted in a longitudinal groove of the shaft, for its rotation with the shaft.

The support is in the form of an arm projecting laterally from the hub, and a shouldered stud 28 fastened in an upright position at the end of this arm provides a shaft for a feed pinion 29 which meshes with the nut gear. A shroud lever 30 is fulcrumed on the stud at opposite sides of the pinion and it has an outwardly projecting lug 31 for engagement with a stationary pin 32 placed in the path thereof.

The shroud lever carries one or more pawls 33 held in impellent engagement with the teeth of the pinion by a spring 34 and a spring 35 stretched between the lower arm of the lever and a fixed post 36 on the pinion support functions to return the lever to its original position after its lug has disengaged the stationary pin.

In the operation of the thickener the driving wheel is rotated at a constant velocity by the worm 23 and this rotary motion is transmitted to the shaft by the cooperative engagement of the screw thread of the shaft and the hub of the wheel 21. The driving force tends to unscrew the drive wheel from the shaft but this tendency is opposed by the feed mechanism which obviously rotates with the shaft as a unit.

Each time the lug on the shroud lever contacts with the stationary pin 32, it moves about its fulcrum with the result that the pawl or pawls effect a rotary motion of the pinion 29 and thereby cause the nut gear 24 to move around the shaft.

Owing to the screw thread connection of the drive gear with the shaft the latter is moved downwardly by a positive impulse and in this respect the mechanism differs from that described in the above-mentioned companion application for patent in which the shaft moves down by gravity.

When the lug on the shroud lever disengages the pin at the point of intersection of the circles of rotation of the power wheel and the pinion, the spring 35 returns the shroud lever to its original position. The construction as described is of particular advantage in processes involving resistance to the feed motion.

The modified construction illustrated in Figure 4 provides a positive feed motion against both moderate and heavy resistance to the driving force by lessening the thrust of the hub of the power wheel against the hub of the arm on which the feed pinion is supported.

The shaft 17 passes freely through the hub 25 but the latter is provided with a helical key 37 which slides in a correspondingly formed groove 38 of the shaft.

It is evident that the angle of the key-way can be so proportioned as to give only a moderate pressure between the hubs of the drive wheel and the support of the feed pinion, thereby eliminating friction which under excessive driving force necessitated by heavy resistance to the movement of the shaft, might result in locking the hubs against relative rotation. The necessity of constant lubrication is also avoided.

In case it is desired to lift the scraper as, for example, at the end of the operation or for renewal of the filter bed, the feed movement of the shaft may be reversed by reversing the position of the pawls on the shroud lever which is readily accomplished either by turning the lever upside down or by providing pawls having two points at opposite sides of their pivotal axes.

The same result may also be obtained by securing the nut gear against rotation, disengaging the pawls and continuing the driving movement of the worm wheel in clockwise direction.

Having thus described my invention, what I claim and desire to secure by Letters Patent is:—

1. Mechanism of the character described comprising a rotary drive wheel having an internally screw-threaded hub, a shaft having a screw-thread cooperating with that of the wheel hub, a nut on the shaft, a feed member mounted for rotation with the shaft, in driving relation to the nut, and means to cause an actuative movement of the feed member by rotation of the drive wheel.

2. Mechanism of the character described comprising a rotary drive wheel having an internally screw-threaded hub, a shaft having a screw-thread cooperating with that of the wheel hub, a gear nut on the shaft, a support keyed on the shaft, a feed pinion on the support, meshing with the gear nut, and means for rotation of the pinion by rotation of the drive wheel.

3. Mechanism of the character described comprising a rotary drive wheel having an internally screw-threaded hub, a shaft having a screw-thread cooperating with that of the wheel hub, a gear nut on the shaft, a support keyed on the shaft, a feed pinion on the support, meshing with the gear nut, a lever on the support, a pawl on the lever in driving relation to the pinion, and means to effect an operative movement of the lever by rotation of the drive wheel.

4. Mechanism of the character described comprising a rotary drive wheel having an internally screw-threaded hub, a shaft having a screw-thread cooperating with that of the wheel hub, a gear nut on the shaft, a support keyed on the shaft, between the drive wheel and the gear nut, a feed pinion on the support, meshing with the gear nut, a lever on the support, a pawl on the lever in driving relation to the pinion, and means to effect an operative movement of the lever by rotation of the drive wheel.

5. Mechanism of the character described comprising a screw-threaded shaft having a helical key-way, a drive wheel having a key in the key-way, a nut on the shaft, a feed member mounted for rotation with the shaft, in driving relation to the nut, and means to effect an actuative movement of the feed member by rotation of the drive wheel.

6. Mechanism of the character described comprising a screw-threaded shaft having a helical key-way, a drive wheel having a key in the key-way, a gear nut on the shaft, a support keyed on the shaft, a feed pinion on the support, meshing with the gear nut, a lever on the support, a pawl on the lever, engaging the pinion, and means to effect an operative movement of the lever by rotation of the drive wheel.

7. Mechanism of the character described comprising a rotary drive wheel having an internally screw-threaded hub, a shaft having a screw-thread cooperating with that of the wheel hub, a gear nut on the shaft, a support keyed on the shaft, a feed pinion on the support, meshing with the gear nut, a lever on the support, a pawl on the lever in driving relation to the pinion, and a stop disposed to be engaged by the lever during rotation of the drive wheel.

8. Mechanism of the character described comprising a screw-threaded shaft having a helical key-way, a drive wheel having a key in the key-way, a nut on the shaft, a support keyed on the shaft, a feed pinion on the support, and means to effect a rotary movement of the pinion by rotation of the drive wheel.

9. Mechanism of the character described comprising a rotary drive wheel having an internally screw-threaded hub, a shaft having a screw-thread cooperating with that of the wheel hub, a nut on the shaft, a feed member mounted for rotation with the shaft, in rotative relation to the nut, and reversible means to cause an actuative movement of the feed member by rotation of the drive wheel.

10. Mechanism of the character described comprising a screw-threaded shaft having a helical key-way, a drive wheel having a key in the key-way, a gear nut on the shaft, a support keyed on the shaft, a feed pinion on the support, meshing with the gear nut, a lever on the support, a reversible pawl on the lever, engaging the pinion, and means to effect an operative movement of the lever by rotation of the drive wheel.

11. Mechanism of the character described comprising a rotary drive wheel having an internally screw-threaded hub, a shaft having a screw-thread cooperating with that of the wheel hub, a nut on the shaft, a feed member mounted for rotation with the shaft, in rotative relation to the nut, and means to cause an actuative movement of the feed member by rotation of the drive wheel, said means being capable of adjustment to cause the shaft to move lengthwise in either direction.

In testimony whereof I have affixed my signature.

CHARLES W. KURIE, Jr.